Figure 1:
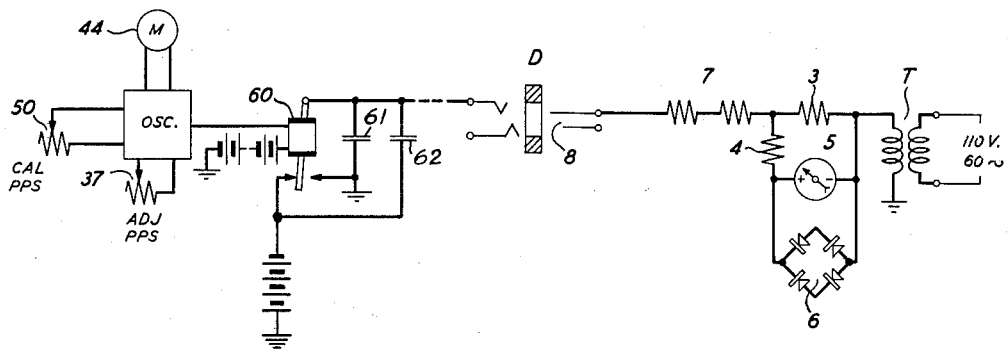

Sept. 27, 1955        R. W. EHRLICH        2,719,232
METHOD OF CALIBRATING AN OSCILLATOR
Filed Dec. 1, 1950        2 Sheets-Sheet 1

30 PPS - 25% BREAK

20 PPS - 16⅔% BREAK

15 PPS - 12½% BREAK

12 PPS - 15% BREAK

10 PPS - 12½% BREAK

INVENTOR
R. W. EHRLICH
BY
R. O. Covell
ATTORNEY

Sept. 27, 1955  R. W. EHRLICH  2,719,232
METHOD OF CALIBRATING AN OSCILLATOR
Filed Dec. 1, 1950  2 Sheets-Sheet 2

INVENTOR
R. W. EHRLICH
BY
R. O. Covell
ATTORNEY

United States Patent Office

2,719,232
Patented Sept. 27, 1955

2,719,232
METHOD OF CALIBRATING AN OSCILLATOR

Robert W. Ehrlich, West Orange, N. J., assignor to American Telephone and Telegraph Company, a corporation of New York Application December 1, 1950, Serial No. 198,674

4 Claims. (Cl. 250—36)

This invention relates to testing and particularly to the calibration of variable frequency oscillators or other sources of trains of current impulses.

Objects of this invention are the checking of the impulse frequency of a variable frequency impulse source and calibration of the source to assure the transmission of test impulses at a desired frequency to the circuit unit or other device undergoing test.

In testing apparatus arranged to transmit trains of current impulses at any desired frequency within predetermined limits for the purpose of testing impulse responsive devices, for instance, selective switches or impulse repeaters in telephone systems, it is necessary that the frequency of the test impulses be checked from time to time and that the variable frequency source be calibrated to insure satisfactory testing. A usual method of checking the frequency of impulses and calibration of a variable frequency source of impulses is to transmit impulses to an oscilloscope simultaneously with impulses of a known standard frequency such as 60 cycles per second. It may, however, become necessary to check an oscillator or other source of impulses when an oscilloscope is not available. This invention is a method of determining the frequency at which impulses are being generated by an oscillator or other source of impulses and consists principally of utilizing the output of the impulse source to modulate an alternating current from a standard frequency source, applying a voltage derived from the modulated current to a galvanometer, varying the frequency of the source being checked by manual adjustment, and observing the successive adjustments at which steady readings are obtained on the galvanometer, steady readings being obtained at impulse frequencies which are integral submultiples of the frequency of the standard frequency source. The variable frequency impulse source may then be calibrated by marking the positions of the adjusting means corresponding to the successive submultiple frequencies or by applying the impulse output to a frequency indicator and adjusting the indicator to read the exact submultiple frequency which produces a particular observed steady reading of the galvanometer.

A feature of the invention is a method as above described including rectification of the modulated current from which the voltage is derived for application to a galvanometer.

Figure 2A:
Figure 2B:
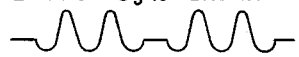
Figure 2C:
Figure 2D:
Figure 2E:
Figure 3:
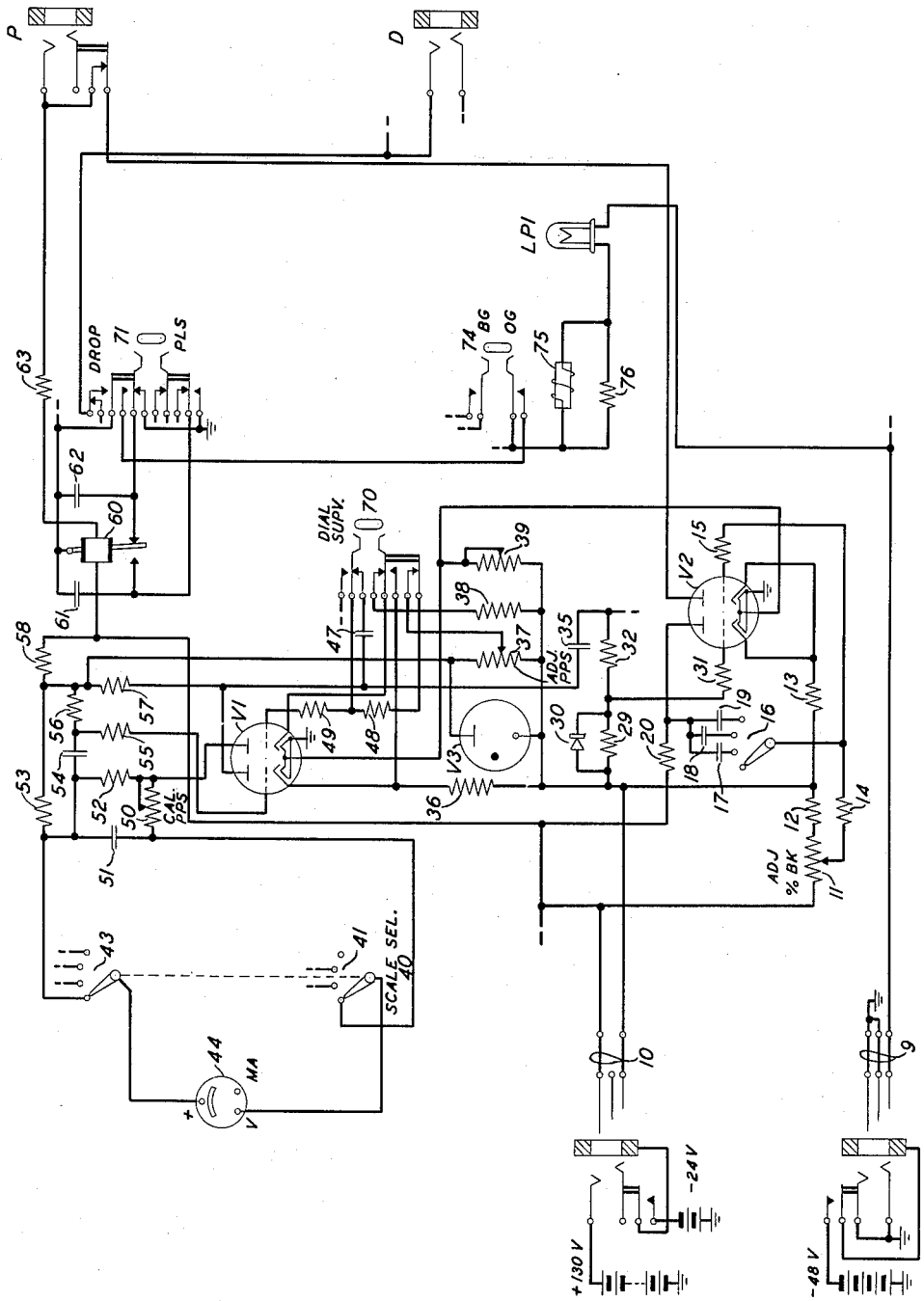

The drawing shows schematically in Fig. 1 a source of impulses and means for checking the output impulse rate according to the method which constitutes applicant's invention. Figs. 2a to 2e represent wave forms of the current resulting from superimposing the output impulses from the source undergoing check on an alternating-current wave of known standard frequency. Fig. 3 shows in detail, the source of impulses represented, in simplified form, in Fig. 1.

The variable source of impulses shown in Figs. 1 and 3 represents the impulse source of a test set which is disclosed in detail in Patent 2,582,691, granted January 15, 1952, to W. W. Fritschi. The impulse output jack D, impulse relay 60, frequency adjusting means 37, frequency indicator 44, and frequency indicator calibrating means 50 have the same reference characters as in the Fritschi patent; and the oscillator OSC comprises the vacuum tubes V1 and V2 and associated apparatus of the Fritschi patent. The 60-cycle per second 110-volt commerical power source which, in the arrangement shown, is to be used as a standard frequency source is connected to the primary winding of a transformer T, the secondary winding of which supplies a voltage, for instance 3 volts, suitable for use in checking the frequency of operations of impulse relay 60 and the frequency of oscillator OSC. In order to facilitate the use of the standard frequency voltage, the secondary winding of transformer T is connected through resistors 3 and 7 to the tip of a plug 8 which may be connected to impulse output jack D. A galvanometer type meter 5 is connected in series with a resistor 4 across resistor 3 and the meter winding is shunted by a half-wave rectifier 6. By using a galvanometer which gives both positive and negative readings the half-wave rectifier may be omitted.

The source of impulses which is shown in detail in Fig. 3 includes plug ended cords 9 and 10 for connecting to 24-volt, 48-volt and 130-volt potential sources. It includes two electronic multivibrators and a relay 60, which may be of the polarized mercury contact type, for generating current impulses at a desired rate and having a desired per cent break. The multivibrator, which generates impulses to operate relay 60, comprises the double triode V2; a resistor 20 included in the anode-cathode circuit of the left triode; a resistor 63 in series with the winding of relay 60 in the anode-cathode circuit of the right triode; a resistor 13 included in the anode-cathode circuit of both triodes; a resistor 12 and potentiometer 11 controlling the potential applied through resistors 14 and 15 to the grid of the right triode; a switch 16; and capacitors 17, 18 and 19, through any one of which the anode of the left triode may be connected to the grid of the right triode. The other multivibrator comprises the double triode V1; resistors 52, 53, and 58 connected in the anode-cathode circuit of the right triode; capacitor 54 and resistor 55 connecting the anode of the right triode to the grid of the left triode; resistors 36, 57 and 58 in the anode-cathode circuit of the left triode; resistor 38 normally connected through a contact of key 70 in the anode-cathode circuit of the right triode; capacitor 47 normally connecting the anode of the left triode through a contact of key 70 and resistor 49 to the grid of the right triode; and a potentiometer 37 normally connected through a contact of key 70 and resistors 48 and 49 to the grid of the right triode. The anode of the left triode of tube V1 is connected through a capacitor 35 and resistors 32 and 31 to the grid of the left triode of tube V2, whereby control impulses generated in tube V1 are transmitted to trigger the tube V2 at the desired impulse rate. A meter 44 is controlled by a scale selector switch 40, in one position of which the meter is connected in series with variable resistor 50 and the parallel capacitor 51 across the resistor 52 in the anode circuit of the right triode of tube V1, to indicate the pulsing rate in pulses per second. When the meter is used to indicate the pulsing rate of multivibrator V1, adequate damping is provided by resistor 50 and shunt capacitance 51. A gas-filled voltage regulator tube V3 and resistor 58 serve to minimize voltage variations and surges which might otherwise cause a variation of the pulsing rate. Jacks are provided, including jack D for connecting the impulse source to signaling circuits and trunk circuits, the testing of which requires the transmission of impulses thereto. The operation of key 70 renders tube V1 ineffective to cyclically generate control impulses for triggering tube V2; and in this case jack P enables connection of relay 60 for control by an outside source of ground impulses.

When it is desired to transmit impulses through jack D, key 70 is placed in normal position, and keys 71 and 74 are operated to connect the —48 volt power source through the normally closed right contact of impulse relay 60 to the tip conductor of jack D. The potential between the grid and cathode of the left triode of tube V1 is such that there is a current in the anode-cathode circuit creating a drop in potential in resistor 57 and a difference in potential across condenser 54. As condenser 54 charges, the grid of the right triode quickly becomes more negative with respect to its cathode. At a predetermined point in the discharge of condenser 47, the space current in the left triode is reduced to zero by space current being initiated in the right triode and the coupling provided by condenser 54. Condenser 54 then begins to discharge through resistors 53 and 56 in series and, at the end of a predetermined interval, the potential across condenser 54 reaches a point at which space current is again started in the left triode; and due to the coupling provided by condenser 47, the grid of the right triode thereupon becomes sufficiently negative with respect to its cathode to terminate the space discharge in the right triode. The time during which there is no space current between the anode and cathode of the left triode is determined by the capacitance of condenser 54 and the resistance of resistor 56; and is in the order of .015 second. The time during which there is no space current in the right triode depends on the capacitance of condenser 47 and resistor 48 and the adjustment of the potentiometer 37; and the recycling time of the multivibrator V1 may be varied so that the minimum pulsing rate is approximately three pulses per second and the maximum pulsing rate is about twenty pulses per second. With multivibrator V1 operating as described, each time that there is an impulse of current in the anode-cathode circuit of the left triode, this impulse is differentiated by means of condenser 35, resistors 32 and 29 and varistor 30 and applied through resistor 31 to the grid of the left triode of tube V2. The combination of resistors 32 and 29 and varistor 30 attenuate the negative portion of the impulse to produce a suitably shaped impulse for triggering the tube V2. The grid of the left triode of tube V2 is normally biased by the voltage drop in resistor 13 so that there is no space current in this triode; but each time a triggering impulse is impressed on this grid, a space discharge is initiated in the left triode of tube V2 which produces a sudden voltage drop in resistor 20. This drop in voltage is applied through one of capacitances 17, 18 and 19, switch 16 and resistor 15 to the grid of the right triode to terminate the space current in this triode and hold it non-conductive for a predetermined interval. This interval depends upon the setting of switch 16, potentiometer 11 and resistor 14. By changing the setting of switch 16 to include a different one of capacitances 17, 18 and 19 and by an adjustment of potentiometer 11, the length of non-conducting interval may be varied as desired. Relay 60 is thus operated at the rate control impulses are transmitted from multivibrator V1 to trigger tube V2. Each operation of relay 60 opens the connection between the —48 volt power source and the tip conductor of jack D and connects ground potential thereto; and the alternate operation and release of relay 60 transmits impulses at a desired impulse rate, through jack D to any signaling circuit, trunk or test set connected thereto, the impulses thus transmitted having a desired per cent break.

When the output impulse frequency of relay 60 and oscillator OSC is to be checked, plug 8 is inserted in jack D, and the oscillator OSC is normally adjusted to generate impulses at the highest frequency of its range. It will be assumed that this frequency is approximately 25 impulses per second. Impulse relay 60 is operated by each impulse being generated by the impulse generator OSC as described in detail in the aforementioned Fritschi patent. To prepare for adjustment of the impulse frequency and calibration of the oscillator OSC, the key 71 shown in the Fritschi patent is operated to the Drop position to connect the armature of relay 60 to the tip conductor of jack D. With key 71 operated and with the plug 8 inserted in this jack, the left winding of transformer T is connected as shown in the drawing in series with the meter 5 to ground at the normally open contact of relay 60. Each impulse from oscillator OSC operates relay 60 and closes a circuit from ground, through the normally open contact of relay 60, tip conductors of jack D and plug 8, resistors 7 and 3, and left winding of transformer T to ground, the alternating voltage drop across resistor 3 being applied through resistor 4 across the meter 5. When each impulse from oscillator OSC terminates, relay 60 releases. With no grounded source of potential connected to the left (normally closed) contact of relay 60, there is no current through the meter 5 during the intervals between impulses. Since the winding of meter 5 is shunted by the half-wave rectifier 6, the negative half cycles of the 60 cycle current are partially suppressed and the wave form of the current through the meter will be similar in form to the waves shown in Figs. 2a to 2e. If in preparing for calibration of oscillator OSC, the key 74 (shown in the Fritschi patent) is operated in addition to the operation of key 71, a —48 volt potential is connected to the left (normally closed contact) of relay 60; so that there is a closed circuit through resistors 7 and 3 and the left winding of transformer T during the intervals between impulses; but there is no current through the meter 5 during these intervals due to the polarity of the voltage connected to the left contact of relay 60 and the short circuiting effect of the half wave rectifier 6. Thus in either case, (with no potential connected to the normally closed contact of relay 60 and also with a negative potential connected to this contact of a value in excess of the maximum voltage induced in the left winding of transformer T), the pointer of the meter 5 tends to take a position dependent upon the integrated difference between the positive and negative half cycles of the current through the meter 5; and, assuming that the impedance of the rectifier 6 is low with respect to that of the meter 5, gives a positive reading. The pointer will drift back and forth depending upon the point in the wave at which the relay 60 opens and closes the circuit, and the maximum reading depends upon the per cent break of the impulses created by the contacts of relay 60. In order that the meter will give a substantial reading, the test set should be adjusted as described in the aforementioned Fritschi application to transmit impulses of comparatively low per cent break. The adjusting means 37 is now slowly moved to decrease the frequency of the output impulses. When an adjustment is reached at which the output impulse frequency is 20 impulses per second, the pointer of meter 5 will give a steady indication because each make and break of the contacts of relay 60 will occur at exactly the same point in the current wave. The particular points at which steady readings occur may be any place on the scale of the meter 5. The wave form of the current through the winding of meter 5 at this adjustment, assuming 16⅔ per cent break, is illustrated in Fig. 2b. Since steady readings on the meter will occur at each integral submultiple frequency of the standard frequency source, it is necessary to make certain as to which submultiple frequency is producing a steady reading. To this end the adjusting means 37 is again moved slowly until each of the next two or three submultiple frequencies have been indicated by steady readings on the meter 5. In addition a frequency reading is taken on the frequency scale of meter 44 corresponding to each of the three steady readings on meter 5. While the frequency indicator is not expected to read accurately until after it has been recalibrated, if the differences between the successive readings on the frequency indicator corresponding to the first three observed steady readings on the galvanometer are approximately 5, 3 and 2, respectively, it is apparent that the impulse frequencies at which these three steady readings occur are respectively 20, 15 and 12 impulses per second. The frequency indicating meter 44 may thereupon be calibrated at any one of these three frequencies by moving adjusting means CAL until the meter 44 reads the exact submultiple frequency which is producing a particular steady reading.

The five wave forms, Fig. 2a to Fig. 2e, illustrate the wave form of the current through meter 5 at submultiple frequencies of 30, 20, 15, 12 and 10 impulses per second, respectively. These wave forms differ, however, with respect to the particular point or phase of the wave at which the contacts of relay 60 open and close. The curves also vary as to the per cent break of the output impulses, the exact per cent break in each case being chosen to facilitate accurate representation of the open portion of an impulse cycle.

While a 60-cycle per second commercial power source is shown in the drawing as the source of standard frequency, any standard frequency source, for instance, a 50-cycle per second commercial power source could be used. Furthermore the means for rectifying the current through the galvanometer type meter 5 may be any known means; and while the impulse relay 60 constitutes means for repeating the output of oscillator OSC any other suitable means for repeating the output of the oscillator may be substituted for relay 60. It is, of course, necessary that the standard frequency source be one having submultiples within the range of frequencies produced by the impulse source which it is desired to check.

What is claimed is:

1. A method of determining the various frequency adjustments of a variable frequency oscillator at which the frequency of impulses of current generated by the oscillator is a submultiple of a standard frequency, said method involving the use of a standard frequency voltage source and a galvanometer and comprising applying a voltage of said standard frequency to said galvanometer during each current impulse generated by said oscillator, suppressing the half cycles of one polarity of the voltage applied to said galvanometer, and slowly adjusting the oscillator so as to vary the frequency of the oscillator output from the highest frequency to the lowest frequency of its range, each successive steady reading of the galvanometer indicating an adjustment at which the frequency of the oscillator output is a submultiple of the standard frequency.

2. In combination, an oscillator generating impulses of current, means for adjusting said oscillator so as to vary the frequency of the oscillator output impulses within a range which includes three or more submultiples of a standard frequency, a voltage source of said standard frequency, frequency indicating means connected to the output of said oscillator giving readings proportional to the frequency of the oscillator output impulses, a galvanometer, means connecting said galvanometer and said standard frequency source in a series circuit, electromagnetic means connected to the output of said oscillator for alternately closing and opening said circuit, and rectifying means connected to said galvanometer suppressing the half cycles of current of one polarity through the galvanometer, the ratio of successive readings on said frequency indicating means corresponding to steady point readings of said galvanometer being indicative of the particular submultiple of said standard frequency being generated by said oscillator when said adjusting means is set to produce a steady reading of the galvanometer.

3. A method of calibrating an oscillator unit which includes a frequency indicator, said oscillator being adjustable to generate current impulses at any desired rate within a range which includes three or more submultiples of a standard frequency, said method involving the use of a standard frequency voltage source and a galvanometer and comprising applying a voltage of said standard frequency to said galvanometer during each current impulse generated by said oscillator, suppressing the half cycles of one polarity of the voltage applied to said galvanometer, adjusting the oscillator so as to vary the frequency of the output current from the highest frequency to the lowest frequency of its range, observing each successive adjustment setting at which a steady reading of the galvanometer occurs, applying the output of the oscillator to said frequency indicator when the adjustment of the oscillator is any desired one of said adjustments at which a steady reading of the galvanometer occurs and observing the reading of the frequency indicator at each successive adjustment at which a steady galvanometer reading occurs thereby to identify the particular submultiple of the standard frequency at which the oscillator is operating for each said successive adjustment, and finally adjusting the frequency indicator to read the exact submultiple frequency thus identified thereby completing calibration of the oscillator unit.

4. A method of calibrating a generator of current impulses, the generator including means for varying the frequency of the impulses within a predetermined range of frequencies, said method involving the use of a standard frequency voltage source and a galvanometer and comprising rectification of a voltage derived from said standard frequency source and application of the rectified voltage across the galvanometer winding during each interval of time that a current impulse is being generated, slowly adjusting the means for varying the impulse frequency of the generator between the limits of the frequency range, and marking each adjustemnt at which a steady reading of the galvanometer occurs, each successive steady reading of the galvanometer during said adjusting indicating an adjustment at which the frequency of the impulse generator is a submultiple of the frequency of the standard frequency source.

References Cited in the file of this patent
UNITED STATES PATENTS

| | | |
|---|---|---|
| 1,647,270 | Burton | Nov. 1, 1927 |
| 2,363,835 | Crosby | Nov. 28, 1944 |